Nov. 29, 1966 J. M. FELIZ 3,288,234

STAIR CLIMBING CONVEYANCE

Filed Aug. 17, 1964 10 Sheets-Sheet 1

INVENTOR.
Jack M. Feliz,
BY
Paul & Paul
ATTORNEYS.

STAIR CLIMBING CONVEYANCE

INVENTOR.
Jack M. Feliz,
BY
Paul & Paul
ATTORNEYS

INVENTOR.
Jack M. Feliz,
BY
Paul & Paul
ATTORNEYS.

INVENTOR.
Jack M. Feliz,
BY
Paul & Paul
ATTORNEYS.

INVENTOR.
Jack M. Feliz,
BY
Paul & Paul
ATTORNEYS.

STAIR CLIMBING CONVEYANCE

Filed Aug. 17, 1964 10 Sheets-Sheet 6

INVENTOR.
Jack M. Feliz,
BY
Paul & Paul
ATTORNEYS

INVENTOR.
Jack M. Feliz,
BY
Paul & Paul
ATTORNEYS.

STAIR CLIMBING CONVEYANCE

INVENTOR.
Jack M. Feliz,
BY
Paul & Paul
ATTORNEYS.

STAIR CLIMBING CONVEYANCE

Filed Aug. 17, 1964 10 Sheets-Sheet 9

INVENTOR.
Jack M. Feliz,
BY
Paul & Paul
ATTORNEYS.

INVENTOR.
Jack M. Feliz,
BY
Paul & Paul
ATTORNEYS.

United States Patent Office 3,288,234
Patented Nov. 29, 1966

3,288,234
STAIR CLIMBING CONVEYANCE

Jack M. Feliz, Camden, N.J.
(34—808 Via Echo, Palm Springs, Calif.)

Filed Aug. 17, 1964, Ser. No. 390,044
28 Claims. (Cl. 180—6.5)

This invention relates to a conveyance intended primarily for use by handicapped persons or invalids.

The chief aim of my invention is to provide a self-contained conveyance which will enable a handicapped person or invalid to cope safely with problems encountered, such, for example, as moving conveyance into or out of an automobile, a taxicab, plane or other means of transportation in going to or from work; in ascending or descending stairways and curbs; in traversing obstructions which may be encountered at home, in a factory or out-of-doors, and ready access to shelves or cabinets at elevations beyond ordinary reach.

Another aim of my invention is to secure the foregoing advantages in a conveyance which is manually operable, with a minimum amount of exertion on the part of a seated occupant, for forward or rearward propulsion as well as making turns in one direction or the other either within or out-of-doors; which is operable under effortless manual control by power for moving conveyance, with seat folded, into or out of an automobile, or with occupant seated in conveyance for entry into or alighting from a bus, railway car, plane, or some automobiles with sufficient head room, as the case may be, and in ascending or descending stairways; with the occupant automatically maintained in an upright position; which, in the event of power failure incident to stair ascension or descension is held, against retrogression, to the stairs, which is maneuverable under power to raise the occupant for access to elevations beyond ordinary reach; which is collapsible into a small compass for convenience of carriage in an automobile or other transportation vehicle, or for ready storage under a bed or in a closet when its use is not required; and which, moreover, is light in weight, relatively simple in construction and sturdy against easy derangement over long periods of use.

Other objects and attendant advantages will appear from the following detailed description of the attached drawings, wherein.

Figure 1:
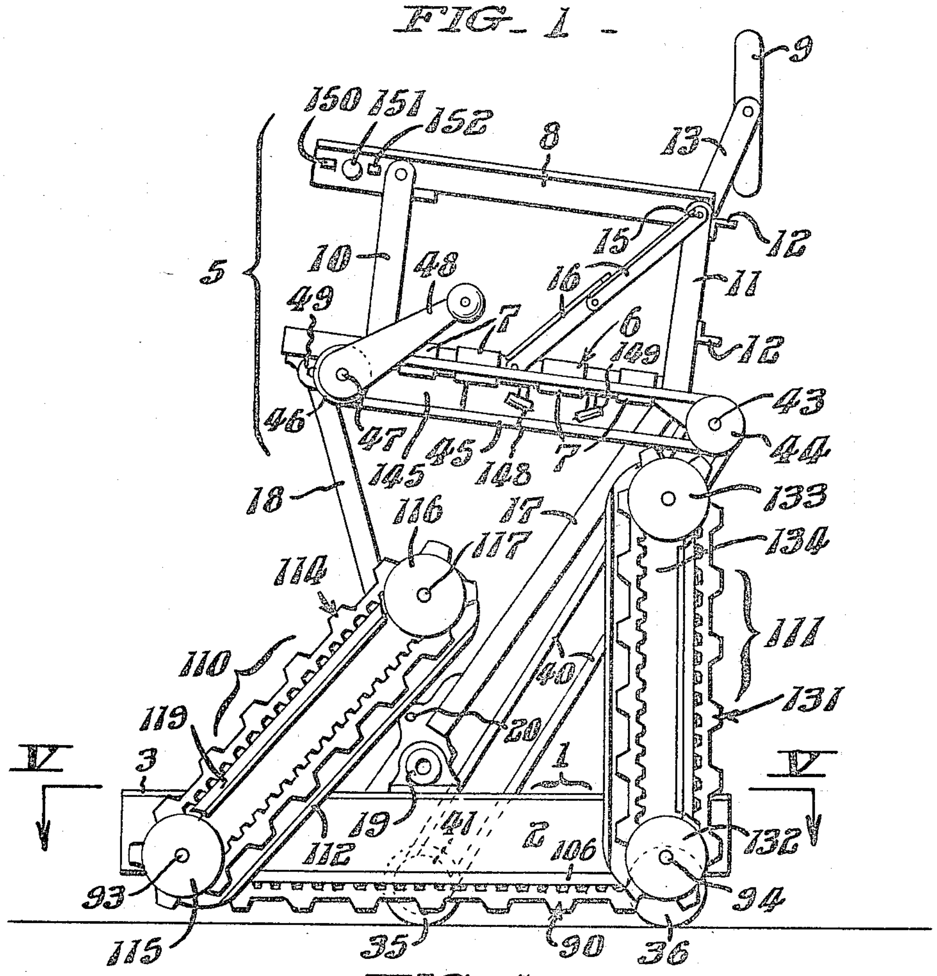
FIG. 1 shows the conveyance in side elevation when arranged for manual progression on floors indoors or on pavements out-of-doors.
Figure 2:
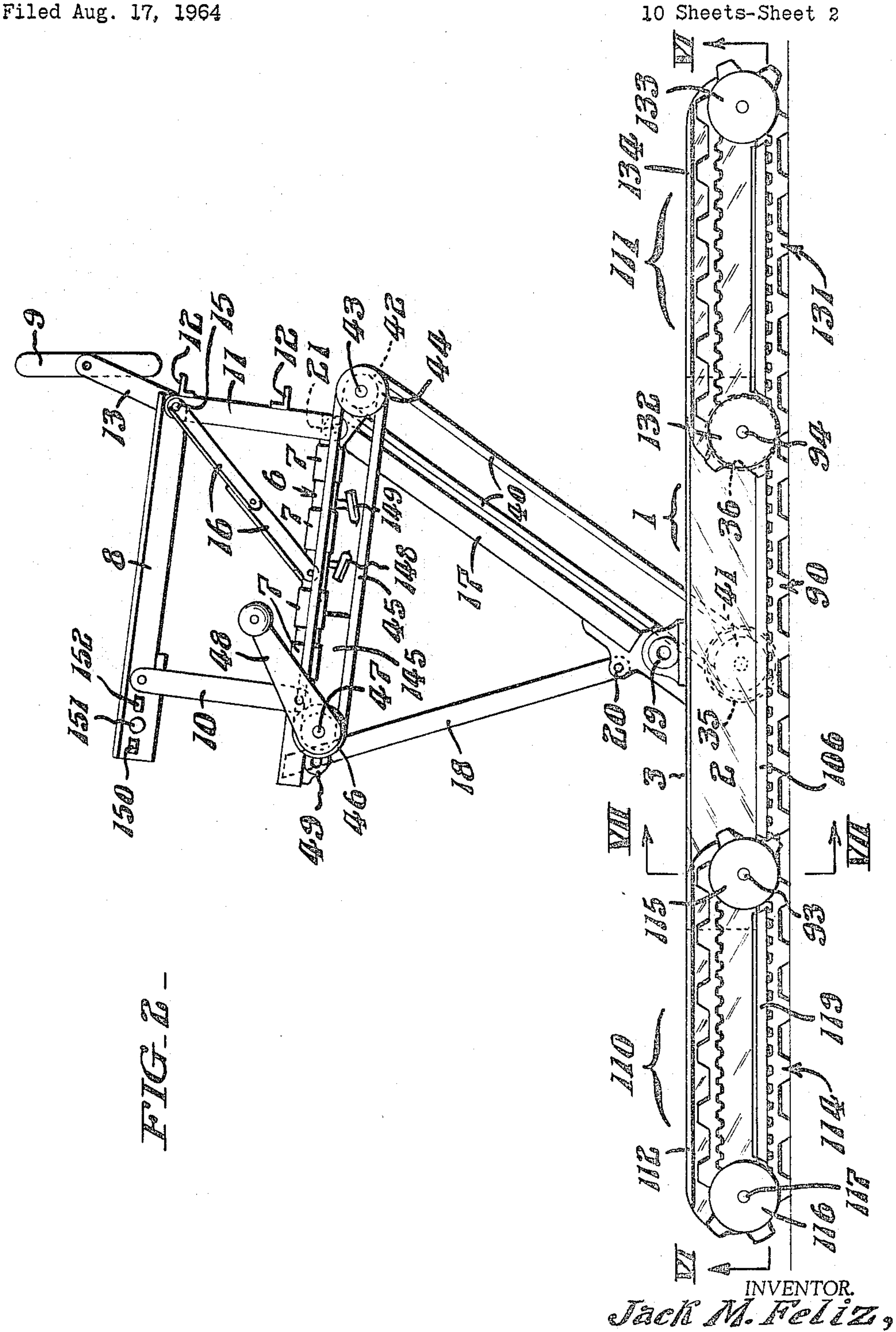
FIG. 2 shows the conveyance in side elevation completely set up in readiness for propulsion by power.
Figure 15:
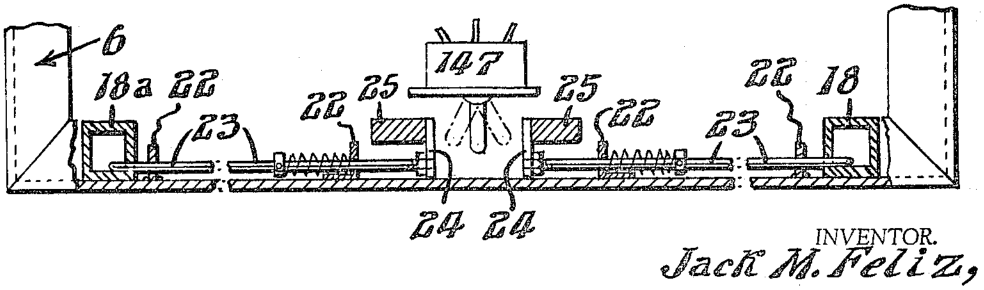
FIG. 15 is a fragmentary detail view, partly in plan, and partly in section, taken as indicated by the angled arrows XV—XV in FIG. 3 and drawn to a larger scale.

With more specific reference, first more particularly to FIGS. 1–5 of these illustrations, the conveyance of my invention comprises a platform 1 which is rectangular in plan, and which has a frame 2 constructed of channel section bar metal with the hollows of said bars facing inwardly, and a cover plate 3 that serves as a foot rest. Mounted on the platform 1 is a chair 5 having a seat 6, the frame of which is rectangular and fashioned from angle section bar material. As herein exemplified, the seat frame is spanned by interlaced bands 7 which may be of plastic or textile fabric. The chair 5 is provided with left and right arm rests 8 and 8*a* and a back 9, each arm rest being connected at opposite ends to the corresponding side rails of the seat frame by links 10 and 11 whereof the latter are rigidly united by spaced cross bars 12. By means of other links 13, the back 9 is connected to the rear ends of the arm rests 8, 8*a*, the pivots at 15 being common to said links 13 and to the links 11. Knuckle-jointed links 16, one at each side of the chair 5, serve to normally hold the arm rests 8 and 8*a* and the back 9 against collapse onto the seat 6 in a manner readily understood from FIGS. 1 and 3. If desired, the platform 1 may be provided with a foot rest and the chair 5 with an adjustable head rest for the greater comfort of the user. As shown, the chair 5 is sustained at opposite sides by pairs of legs 17 and 17*a* and 18 and 18*a*. The legs 17 and 17*a* are fulcrumed respectively at 19 and 19*a* to fixed lugs on the corresponding side rails of the platform frame 2, while the legs 18 and 18*a* are pivotally connected respectively, as at 20 and 20*a* to their mates 17 and 17*a* adjacent the fulcra 19 and 19*a* of the latter. The distal ends of the legs 17 and 17*a* are pivotally connected respectively to the rear ends of the corresponding side bars of the seat frame at 21. The distal ends of the legs 18 and 18*a* are engaged normally within the hollow of the front angle bar of the seat frame 6, as best seen in FIGS. 2 and 15. Slidably guided in lugs 22 (FIG. 15) at the back of the pendant flange of the front bar of the seat frame are spring-urged bolts 23 whereon the remote ends normally lock respectively into the distal ends of the chair-supporting legs 18 and 18*a*. At their contiguous inner ends, the bolts 23 are provided with finger tabs 24 which are normally engaged with spaced stop lugs 25 within the hollow of the front bar of the seat frame and which, when pressed together, cause the bolts 23 to be withdrawn from the respective legs 18 and 18*a* to permit collapse of the chair structure as later more fully explained.

Figure 5:
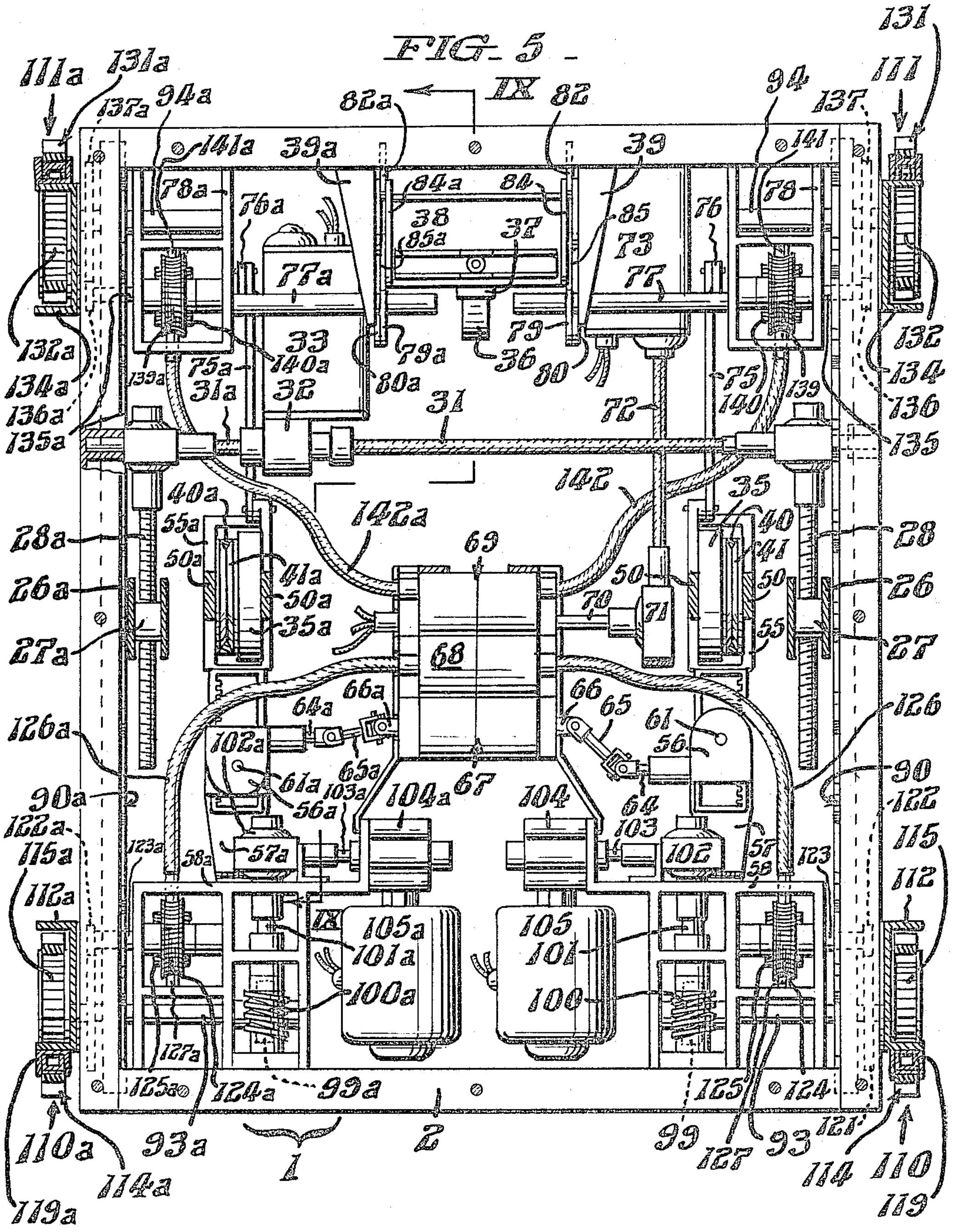
FIG. 5 is a horizontal sectional view taken as indicated by the angled arrows V—V in FIG. 1 and drawn to a larger scale.
Figure 6:
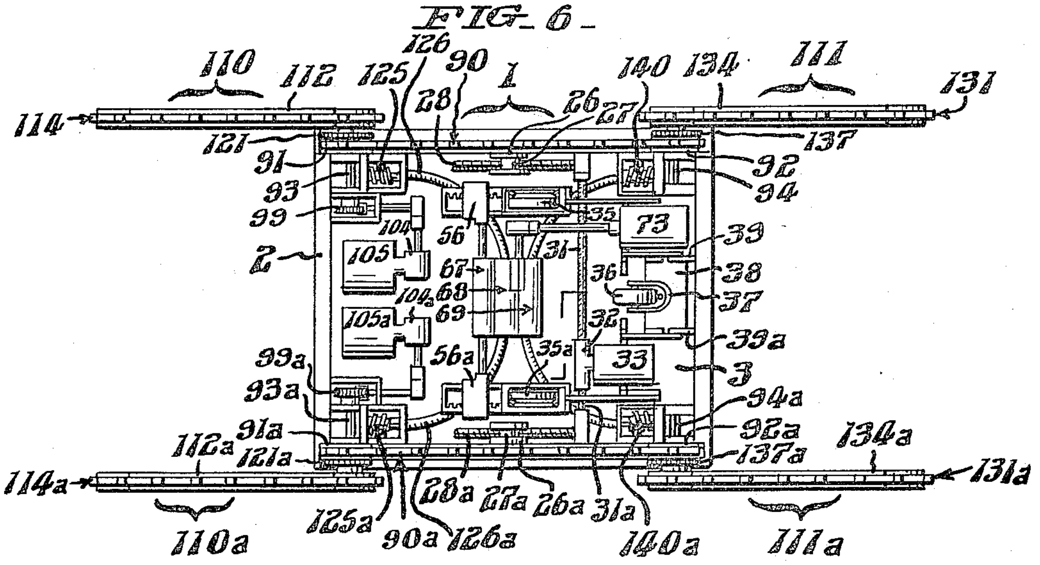
FIG. 6 is an inverted plan view of the conveyance looking as indicated by the angled arrows VI—VI in FIG. 2.
Figure 12:
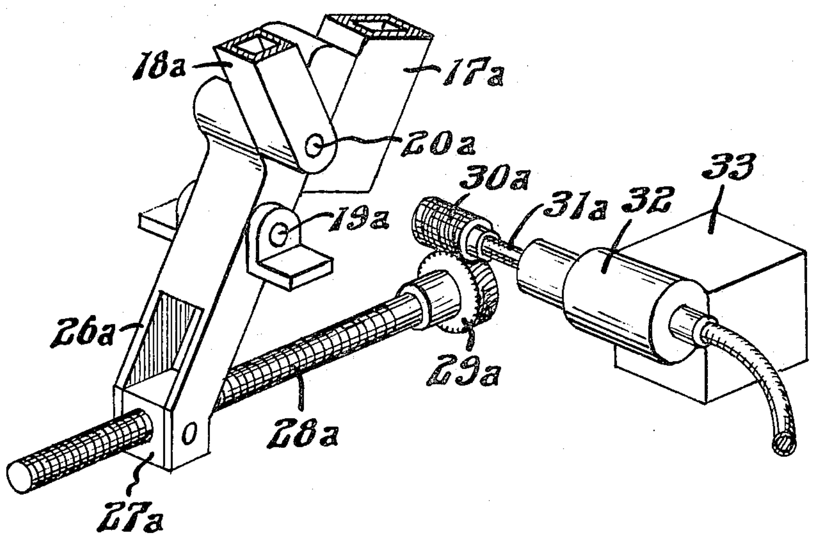

As shown in FIGS. 5 and 12, the chair sustaining legs 17 and 17*a* have, downward of their fulcra 19 and 19*a*, bifurcated extensions 26 and 26*a* wherein are swiveled nuts 27 and 27*a* which are engaged respectively by screw spindles 28 and 28*a*. Worm wheels 29*a* on the respective spindles 28 and 28*a* mesh with worms 30 and 30*a* on flexible transverse shafts 31 and 31*a* (FIGS. 5 and 12) arranged to be driven, through a speed reduction gear unit conventionally represented at 32, by a reversible electric motor 33. Accordingly, when the shafts 31 and 31*a* are rotated in one direction, the chair structure, as a whole, is moved forward about the fulcra 19 and 19*a* of the legs 17 and 17*a* and tilted relative to the platform 1, and when said shafts are reversely rotated, the chair structure is moved rearwardly about said fulcra and oppositely tilted relative to the platform. The purpose of and advantages accruing from the last described provisions will be fully set forth hereinafter.

Automatic seat stabilization is a great asset to the occupant for it offers a strong feeling of security while freeing the occupant of compensating for his state of balance while negotiating stairs and landings.

In ordinary use, for movement in or out-of-doors, the structure is solely supported by three wheels, two of them, designated 35 and 35*a*, being laterally spaced and disposed about midway of the length of the platform 1 respectively immediately inward of the side rails of the frame 2. The third wheel, designated 36, is in the form of a caster with the yoke 37 thereof swiveled in a plate 38 arranged between a pair of spaced brackets 39 and 39*a* which extend forwardly from the rear crossbar of the platform frame 2 at the center; see FIGS. 5, 9 and 11. By means of belts 40 and 40*a*, pulleys 41 and 41*a* affixed respectively to the wheels 35 and 35*a* are connected to pulleys 42 and 42*a* on shafts 43 and 43*a* at the rear of the chair seat. Second pulleys 44 and 44*a* respectively on the shafts 43 and 43*a* are connected by other belts 45 and 45*a* to pulleys 46 and 46*a* on shafts 47 and 47*a* at the front end of the chair seat 6, the latter shafts being provided with hand cranks 48 and 48*a*. Thus, by turning the hand cranks 48 and 48*a* simultaneously in one direction or the other, the wheels 35 and 35*a* are turned through the medium of the corresponding belt connections to move the conveyance either forwardly or rearwardly by the occupant of the chair. It will also be apparent that by concurrently rotating the hand cranks 48 and 48*a* oppositely, the wheels 35 and 35*a* are caused to rotate correspondingly to turn the conveyance completely around either to the right or to the left within the diagonal length of the chair platform. Means, designated 49–49*a* in FIGS. 1–3, at the front of opposite sides of the chair seat are provided for adjusting the tension of the belts 45 and 45*a* as may be required from time to time.

Figures 9, 10, 11:
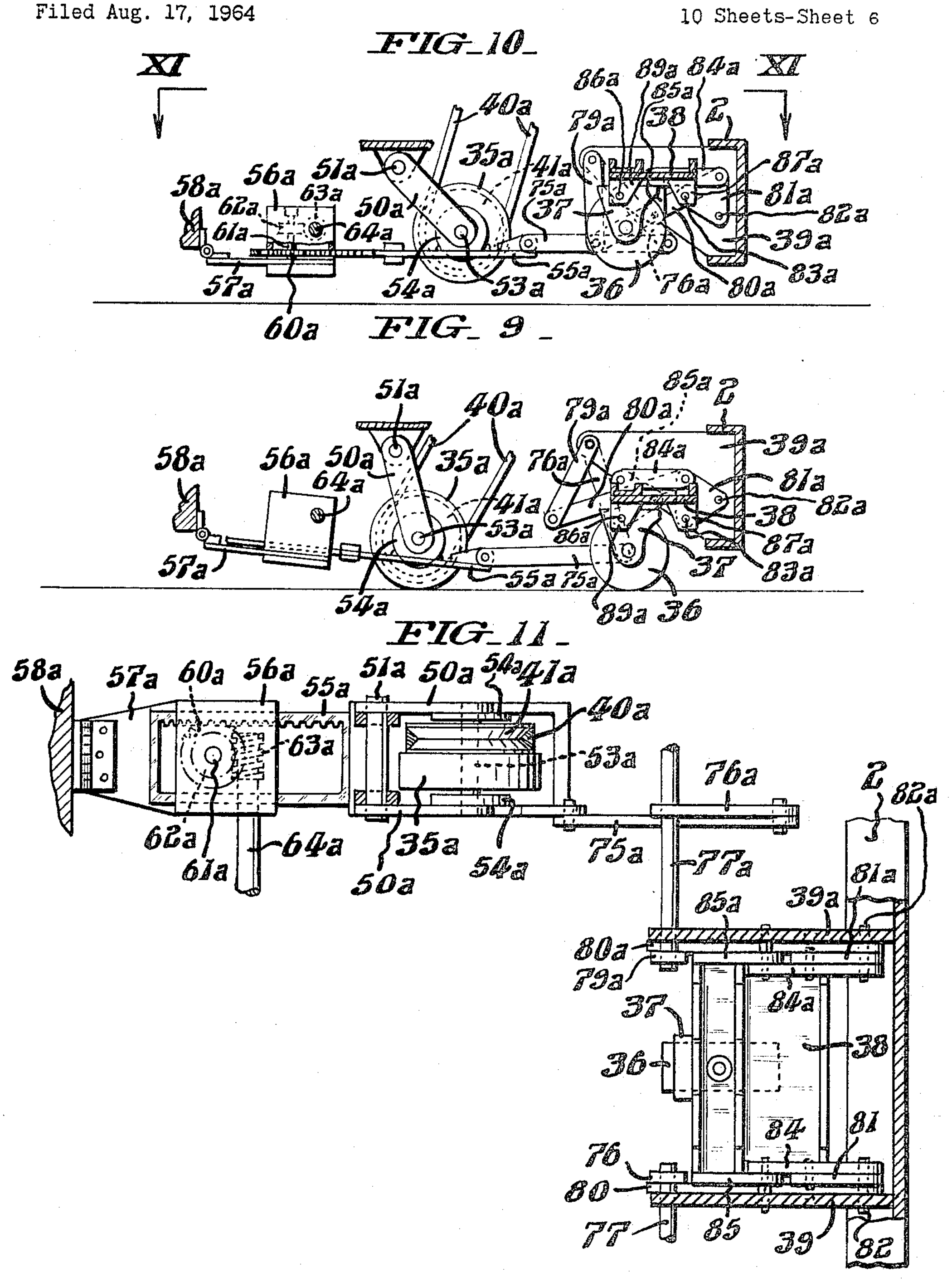
FIG. 9 is a fragmentary view in longitudinal section taken as indicated by the angled arrows IX—IX in FIG. 5.
FIG. 10 is a view corresponding to FIG. 9 with the parts differently positioned.
FIG. 11 is a fragmentary view in top plan looking as indicated by the angled arrows XI—XI in FIG. 10.
Figure 13:
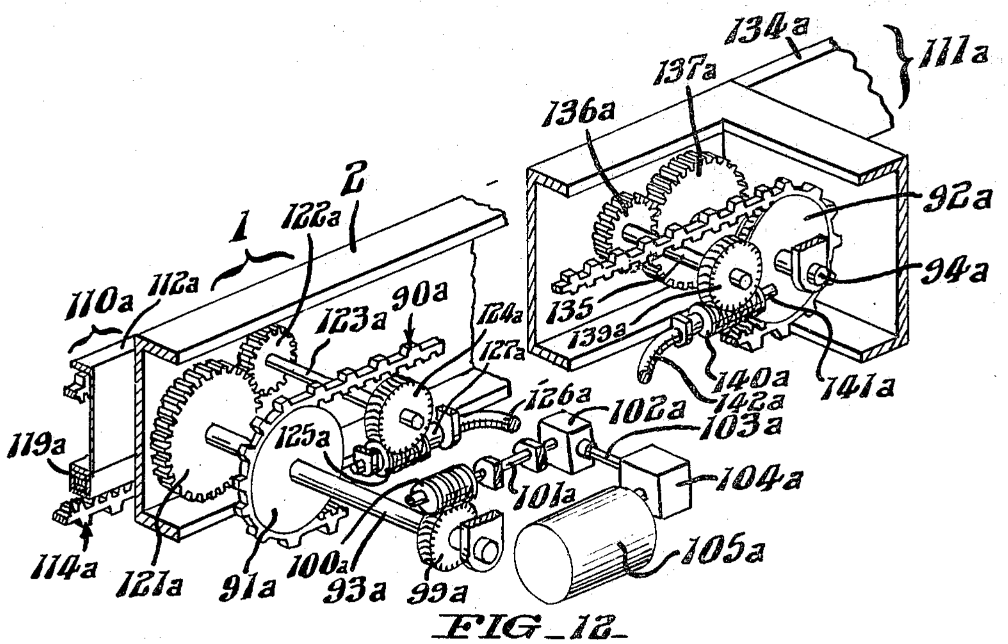
FIGS. 12 and 13 are fragmentary views in perspective showing different parts of the operating mechanism of the conveyance.

Disposed longitudinally within the hollow of the platform is a jack mechanism by which the wheels 35, 35*a* and 36 can be raised or lowered for a purpose later on explained, by power under manual control of the occupant seated in the chair. Part of this jack mechanism is illustrated in FIGS. 9–11, whereto reference will be had for the time being and also to FIG. 5. As shown, the wheel 35*a* has its shaft journaled in a yoked arm 50*a* fulcrumed, as at 51*a*, to lugs on a cross member of the platform frame 2. The shaft 53*a* of the wheel 35*a* also passes through bearing lugs 54*a* on a rack bar 55*a* which is open to clear the wheel. The forward end of the rack bar 55*a* is slidably engaged in a housing 56*a* mounted on an arm 57*a* hingedly connected, for up and down movement, to a bracket 58*a* fixedly supported within one of the frontal corners of the platform frame 2. Disposed within the housing 56*a* is a spur wheel 60*a* which is in mesh with the teeth of the rack bar 55*a*, and affixed to the shaft 61*a* of said spur wheel is a worm wheel 62*a* which meshes with a worm 63*a* on a shaft 64*a*, the latter being coupled by a universally jointed telescoping shaft connection 65*a* to a shaft 66*a* protruding from one end of one section 67 of a six-way transmission unit. This unit is suitably supported within the hollow of the platform 1 and also comprises two other sections, designated 68 and 69, which will again be referred to later. It is to be understood that the transmission is of a type available on the open market and that solenoid-actuated clutches are embodied in the respective sections 67, 68 and 69. As shown, the transmission unit is arranged to be driven through a drive connection 70, 71 and 72 and reversible electric motor 73 supported on the rear cross member of the platform frame 2. By means of a horizontal link 75*a*, the rack bar 55*a* is connected at its rear end to the bottom end of a lever arm 76*a* affixed to a transverse shaft 77*a*, the latter being journaled at one end in the bracket 39*a*, the other end of said shaft being rotatively supported in a bracket 78*a* fixed on one of the rear corners of the platform frame. Also affixed to the shaft 77*a* is a pendant arm 79*a* which through a link 80*a* is connected to a triangular wrist link 81*a* fulcrumed at 82*a* to the bracket 39*a*, said wrist link having a pivotal connection at 83*a* with a pendant lug 87*a* on the plate 38. Still another link 84*a* connects the wrist link 81*a* with a second wrist link 85*a* which has a pivotal connection 86*a* with another lug 89*a* on the plate 38. Like parts of the corresponding arrangement within the hollow of the platform along the opposite side have been identified by the same reference numerals with omission, in each instance, of the exponent "*a*" for convenience of more ready distinction. Upon operation of the unit 67 in one direction, it will be apparent that, through the interposed jack mechanism just described, the wheels 35, 35*a* and 36 will be retracted upwardly into the hollow of the platform 1 from the position in which they are shown in FIGS. 1 and 9 to the raised position of FIG. 10, in which position the wheels are raised sufficiently above the roots of the cleated belts to prevent their striking the leading edges of the stairs.

The provisions made for power operation of the conveyance, under easy effortless control by the person seated in the chair, are as follows: Arranged along opposite sides of the platform are internally toothed and externally cleated endless tractor belts 90 and 90*a* which are trained respectively about sprocket wheels 91, 91*a* and 92, 92*a* keyed to transverse shafts 93, 93*a* and 94, 94*a* that extend laterally through the side rails of the platform frame 2 respectively adjacent opposite ends of the latter. Each belt is formed in two permanently bonded layers 95 and 96, as in FIG. 8, the outer or cleated layer 95 being molded in practice of slip-resistant synthetic rubber, and the inner or gear toothed layer 96 being molded from a tough stretch-proof material, this inner layer being available on the open market. Confining attention for the time being to the tractor belt system at the lefthand side of the conveyance in FIGS. 1, 2 and 3, referring also to FIGS. 5–8 and 13, it will be noted that the shafts 93 and 94 pass freely through bushings 97 which, in turn, are engaged for free rotation in the upright webs of the side channels of the platform frame 2. From FIG. 5 it will be observed that the shaft 93 also has bearing support in the corner bracket 58 and secured to it is a worm wheel 99 which is in mesh with a worm 100 on a transverse shaft 101 journaled in said bracket. Through worm gearing within a housing 102 attached to the bracket 58, the shaft 101 is connected, in turn, to the shaft 103 of a housed worm gear unit 104 arranged to be driven by a reversible electric motor 105 fixedly supported within the hollow of the platform 1. The drive connections for the tractor belt 90*a* at the opposite side of the platform 1 are identified by the same references with addition to them, in each instance of the letter "*a*" in order to dispense with the necessity for repetitive description. Secured to each longitudinal rail of the platform frame 2 is a channel in which the lower run of the corresponding belt is guided by section members 106 and 106*a* in which are lodged low friction strips 107 and 107*a* that bear down upon the lower runs of the respective tractor belts 90 and 90*a*.

Figures 7, 8:
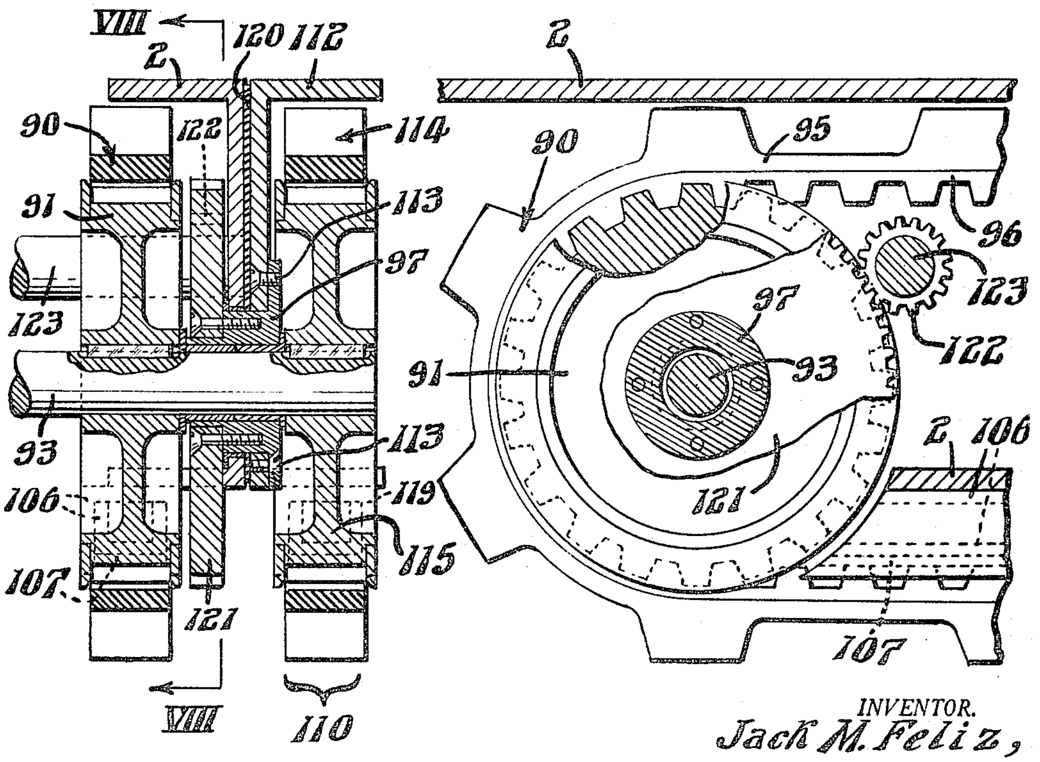
FIG. 7 is a fragmentary view in cross section taken as indicated by the angled arrows VII—VII in FIG. 2 and drawn to a larger scale.
FIG. 8 is a fragmentary view in section taken as indicated by the angled arrows VIII—VIII in FIG. 7.

In order to better enable the conveyance to ascend or descend stairways or to travel over gutter curbs or other obstructions, I have made further provisions including a pair of auxiliary tractor units 110 and 110*a* at the front end of the platform 1, and another pair of auxiliary tractor units 111 and 111*a* at the rear end of the platform. The frontal tractor unit 110 comprises a lever arm 112 which is swingable about the axis of the frontal sprocket shaft 93 of the main horizontal tractor belt 90 as a fulcrum, and to which the sleeve 97 is secured as in FIGS. 7 and 8 by screws 113 that threadedly engage into a circumferential flange on said sleeve. The unit 110 comprises an endless cleated tractor belt 114 which is trained about sprocket wheels 115 and 116 whereof the former is keyed to the shaft 93 with the sprocket wheel 91 for the corresponding main tractor belt 90, and whereof the sprocket wheel 116 is affixed to a shaft 117 at the distal end of the lever arm 112. It is to be understood that a guide channel bar 119 attached to the outer side of the lever arm 112 contains a strip of low friction material for contact by the tractor belt 114. Interposed between the lever arm 112 and the contiguous side rail of the platform frame 2, as shown in FIG. 7, is a sheet 120 of low friction wear preventing material. Secured by screws to the sleeve 97, as in FIGS. 7 and 8, is a spur wheel 121 which meshes with a pinion 122 on a shaft 123 that extends through the contiguous side rail of the platform frame 2 and is rotatively borne in the bracket 58. A worm wheel 124 on shaft 123 is meshed with a worm 125 on shaft 127 arranged to drive through a flexible shaft 126 from the transmission unit 68. The construction of the auxiliary tractor belt unit 110*a* is identical with that just described of the unit 110. This is also true of the associated mechanism and hence corresponding parts have here again been identified by the same reference numerals each with the exponent "*a*."

In addition to the two auxiliary frontal tractor units, I have also provided a pair of similar auxiliary tractor units 111 and 111*a* at the rear of the conveyance. The unit 111 comprises a cleated endless sprocket belt 131 which is trained about sprocket wheels 132 and 133, whereof one is affixed to the sprocket shaft 94 of the main tractor belt and the other is affixed to a shaft at the distal end of a lever arm 134 fulcrumed for swinging movement about shaft 94. Rotatively borne in the bracket 78 is a shaft 135 having thereon a pinion 136 in mesh with a spur gear 137 fast on a sleeve, which latter is free on the sprocket shaft 94 and whereto the lever arm 134 is affixed. A worm wheel 139 fast on shaft 135 is meshed with a worm 140 on a short shaft 141, the latter being also rotatively borne in the bracket 78 and connected, through a flexible shaft 142, with the transmission unit 69 at one end of the latter. Here again, the construction of the other rear auxiliary tractor unit 111*a* is identical with that of the unit 111, and corresponding parts have been identified by the same references each with the exponent "*a*" for brevity of description. This is also true of the instrumentalities between the auxiliary rear tractor unit 111*a* and the transmission unit 69.

Figure 3:
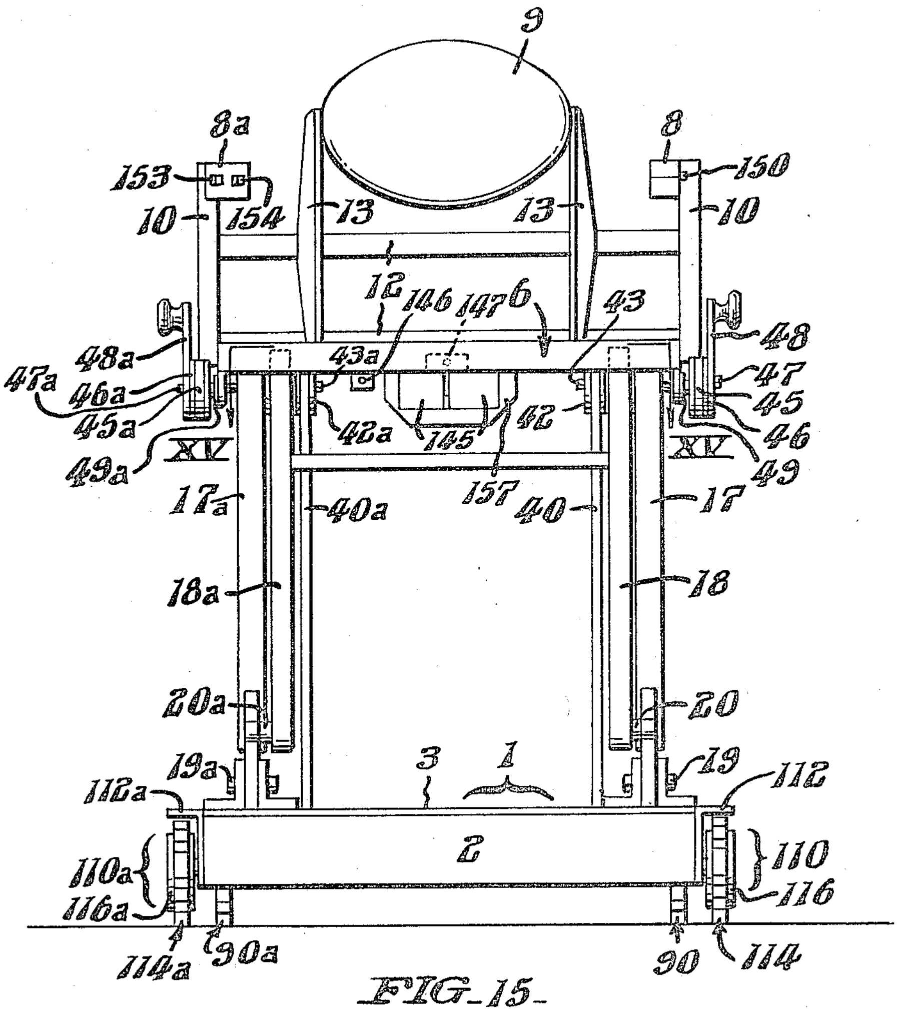
FIG. 3 is a front elevation of the conveyance or as it appears when viewed from the left of FIG. 2.
Figure 14:
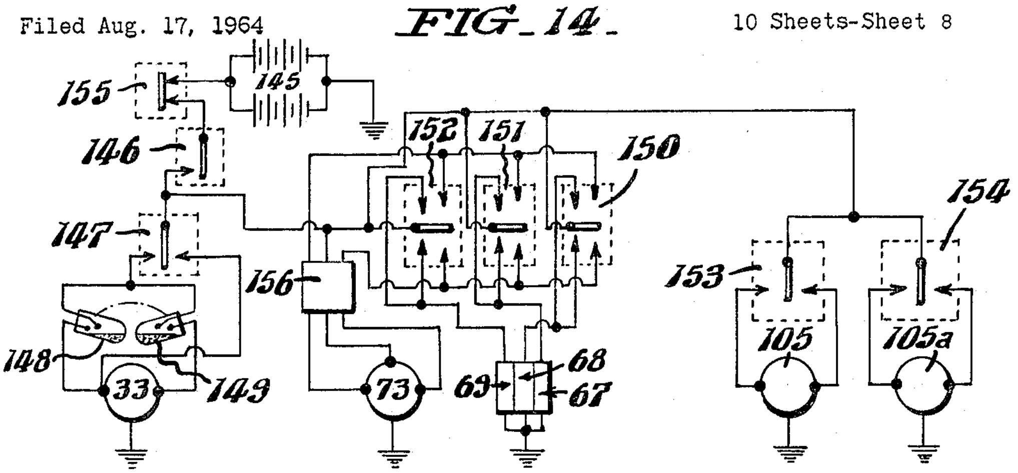
FIG. 14 is a wiring diagram of various electrical instrumentalities relied upon for effecting and controlling operation of the conveyance by power.

Referring now to the wiring diagram of FIG. 14, electric current for energizing the motors 33, 73, 105 and 105*a* is supplied by storage batteries 145. Included in the circuiting are a manually-operable main switch 146, a manually-operable double throw switch 147, a pair of automatically operable mercury switches 148 and 149, manually-operable double throw switches 150, 151, 152, 153 and 154, a circuit breaker 155 and a relay 156, the system being grounded to the chair frame and platform. As shown in FIG. 3, the batteries 145 are supported in a bracket 157 hung from the frame of the chair seat 6 and the switches 146 and 147 are affixed to the front rail of said chair frame. For convenience of ready access, the switches 150, 151 and 152 are affixed, as shown in FIGS. 1, 2 and 3, to the left arm rest 8 of the chair adjacent the front end of the latter, while the switches 153 and 154 are similarly positioned on the right arm rest 8*a*. The mercury switches 148 and 149 are supported centrally beneath the chair seat toward the rear, as shown in FIGS. 1 and 2. The circuit breaker 155 may be supported, with the batteries 145 in the suspension bracket hung from the seat frame 6. The relay 156 is mounted adjacent to the motor 73.

Figure 4:
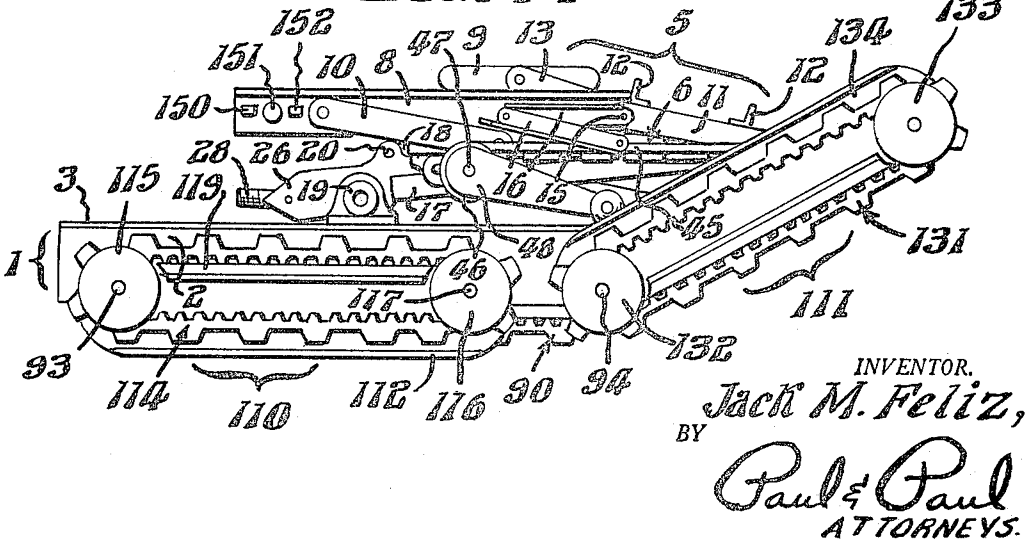
FIG. 4 shows the conveyance in side elevation when collapsed for convenience of ready storage or carriage in an automobile or other transportation vehicle.

To prepare the conveyance for manual propulsion—starting with FIG. 4—the seat 5 is lifted and the legs 18 and 18*a* engaged beneath the front rail of the seat frame 6. In lifting of the seat from horizontal position the spring-urged latch bolts 23 extend themselves, freeing the switch 147 from an interlocked off position to prevent accidental activation of the mercury switches 148 and 149 when handling the chair in a folded position. The main switch 146 at the front of the chair seat 6 is first closed and the switch 147 also at the front of the seat is then moved in one direction, i.e., leftward from the neutral position in which it is shown in FIG. 14. With the seat now raised to upright position the mercury switch 149 is disposed in approximately the same plane as the seat with the contacts of said switch bridged by the mercury and establishment of a circuit to motor 33 for rotation in the proper direction to drive the screw spindles 28 and 28*a* and cause, through the interposed instrumentalities, the legs 17 and 17*a* to be moved counter clockwise about their fulcra. The chair is thus raised to the final position of FIGS. 1–3 when the motor 33 is automatically stopped through opening of the circuit thereto as the mercury levels off in switch 149 clear of the contacts in the latter. With the immediately foregoing accomplished the arm rest 8 and 8*a* are next lifted and then locked against collapse by means of the knuckle-jointed links 16. Thereupon, by shifting the switch 151 leftward in FIG. 14, a circuit is established to the motor 73 and solenoid actuated clutch in transmission 67 for rotation of the latter in the proper direction for motivation of the jack mechanism (FIGS. 5 and 9–11). As the rack bars 55 and 55*a* move downwardly in FIG. 5 or to the left in FIGS. 10 and 11, the wheels 35, 35*a* and 36 will be gradually lowered from the position in which they are shown in FIGS. 2 and 3 into engagement with the floor and the platform 1 ultimately raised to the position of FIGS. 1 and 9 for floor clearance by the main tractor belts 90 and 90*a*. With the foregoing accomplished, it is possible for the chair occupant to propel the conveyance manually in the manner hereinbefore explained.

For forward progression of the conveyance under power, the main tractor belts 90 and 90*a* and auxiliary tractor belts 114, 114*a*, 131 and 131*a* are set in motion by throwing the switches 153 and 154 in one direction, in consequence of which the motors 105 and 105*a* are started to drive the shafts 93 and 93*a* through the intervening gear connections 99, 100, 101, 102, 103, 104, 105 and 99*a*, 100*a*, 101*a*, 102*a*, 103*a*, 104*a* and 105*a* and connecting sprocket shafts 94 and 94*a*. Throwing of the switches 153 and 154 in the opposite direction will result in reversal of the motors 105 and 105*a*, and in reverse driving of all the main and auxiliary tractor belts for rearward progression of the conveyance. Throwing one switch in one direction and the other switch in the opposite direction will cause the main conveyors to be oppositely driven to turn the conveyance in one direction; and, upon reversely positioning and switches, to cause said conveyance to move in the other direction.

When the occupant wishes to lower or raise the front end of the platform, switch 150 is pressed in the desired direction which energizes motor 73 and solenoid actuated clutch and transmission 68 and cause, through the interposed instrumentalities, the frontal auxiliary tractor units 110 and 110a to rotate about their fulcra, and similarly by pressing switch 152 to energize motor 73 and solenoid actuated clutch and transmission 69, the rear auxiliary tractor units 111 and 111a can be moved about their fulcra, to raise or lower the rear end of the platform.

The procedure by which the conveyance is operated and controlled in descending a stairway is as follows: Assume that the main tractor belts 90 and 90a and the auxiliary tractor belts 114, 114a and 131 and 131a are being driven concurrently under power in FIG. 16, to advance the conveyance the occupant of the chair, by means of the manual controls hereinbefore described, causes the frontal auxiliary tractor units 110 and 110a to gradually assume an inclined position corresponding to the angularity of the stairway and the rear tractor belt units 111 and 111a to be swung counterclockwise until the main tractor belts 90 and 90a likewise assume an angular position corresponding to the inclination of the stairway as in FIG. 17. As the center of gravity of the occupant and conveyance pass over the leading edge of the landing in its descent, the chair occupant then causes the rear auxiliary tractor belt units 111 and 111a to gradually assume the angularity of the stairway, as in FIG. 18. During ascent or descent of the conveyance, slippage is effectively prevented by frictional coaction between the cleats of the several tractor belts with the edges of the stair treads, one belt cleat on each side in contact with any one step will hold occupant and conveyance safely on the stairs, as will be readily understood. As the lower floor is approached, the main tractor belts 90 and 90a and the auxiliary tractor belt units 110, 110a and 111, 111a are caused to successively assume the relative angular positions of FIGS. 19 and 20 for the safe landing of the chair occupant. During stair ascent or descent, the chair is automatically maintained in upright position. This is accomplished by gravitation of the mercury in one or the other of the switches 148 and 149 and closing of the circuit to the motor 33 for rotation of the latter in the proper direction and operation of the intervening mechanical connections to move the legs 17 and 17a about their fulcra in relation to the platform 1 to the extent required. Stair ascension is accomplished by reversal of the above procedure with the chair occupant facing either forwardly or rearwardly incident to which one or the other of the mercury switches 148 and 149 will function similarly to cause the chair to be maintained upright.

In a similar way, the conveyance is capable of ascending or descending regular and irregular stairs as well as being moved in confined spaces such as L and U type landings. In the event of power failure during stair ascent or descent, the conveyance will be prevented from slipping due to frictional grip of the cleated tractor belts with the stairs and locking of belt transmission mechanism by the worm gearing involved therein. Moreover, with the belts in contact with the floor, the conveyance is prevented from slipping as the occupant enters or leaves the chair. Complete safety is thus assured to the user of the conveyance.

Steering the chair while ascending or descending can be accomplished by merely relaxing a finger on either switch 153 or 154. This will cause the energized motor and its tractor belt train to move the vehicle toward the de-energized motor and belt train. In order to reduce the amount of steering changes on a long stair a magnetic clutch could be connected between the two running gear drive motors. Electrical switching could be arranged to energize the magnetic clutch when both switches 153 and 154 were pressed in the same direction and de-energized if pressed in the opposite direction or that only one switch was depressed. It will be appreciated that a conveyance constructed in accordance with my invention is capable of negotiating irregular stairs as well as regular stairs at inclinations up to fifty-five degrees but not limited thereto.

Figures 16, 17, 18, 19, 20, 21:
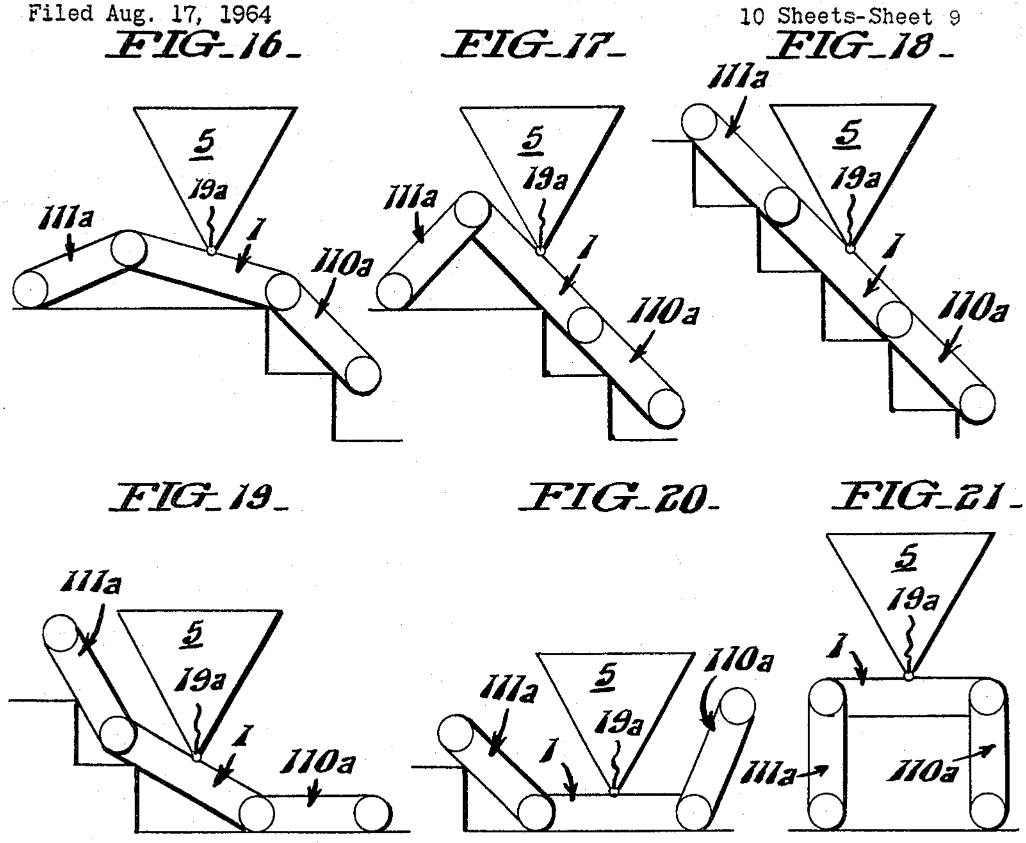
FIGS. 16–20 are diagrammatic views showing the diversified manner in which the conveyance is maneuvered by the occupant incident to descending or ascending stairways.
FIG. 21 is a diagrammatically view showing how the conveyance is maneuvered for access of the occupant to elevations beyond ordinary reach.

With the conveyance arranged for manual propulsion, as in FIG. 1, or for power propulsion, as in FIG. 2, the frontal auxiliary tractor belt units 110 and 110a and the rear auxiliary tractor belt units 111 and 111a may be rotated anti-clockwise and clockwise respectively about their fulcra 93 and 94 to the vertical positions of FIG. 21 to raise the platform 1 for access of the chair occupant to shelves, for example, at an elevation beyond ordinary reach.

Collapsing of the conveyance for convenience of storage or for carriage in an automobile, taxicab or other public transportation, is effected by manually moving switch 147 rightward in FIG. 14 to establish a circuit to cause the chair legs 17 and 17a to be moved clockwise about their fulcra as far as shown in FIG. 4. Then, by compressing the spring-urged latch bolts 23 together the switch 147 will be moved incidentally to central or off position and the legs 18 and 18a released for folding. The seat, being now free, is finally lowered to horizontal position with the latch bolts 23 maintained by their springs against the sides of the legs 18 and 18a adjacent the fulcrum ends of the latter. Finally, the auxiliary tractor units 110, 110a and 111, 111a are moved by power to the retracted positions in which they are shown in FIG. 4. It will thus be apparent that when so collapsed, the structure requires but a small amount of space for its storage when its use is not desired. In its collapsed condition, it can be easily moved when the wheels 35, 35a and 36 of the jack means are extended, as will be readily understood.

By omitting the chair and the actuating mechanism therefor, it is possible to use the conveyance as a truck by placing the articles to be transported upon the platform and causing the power of the jack mechanism and tractor belts 90, 90a to be controlled and operated for stair ascension or descension in factories or stores, or travel up and down ramps in loading or unloading delivery trucks or the like. When the conveyance is adapted for these purposes, it is to be understood that the batteries and the control switches for the conveyer belt drive and jack mechanisms will be mounted in such a way as to leave the platform free of obstruction and yet readily accessible to the user.

Figure 23:
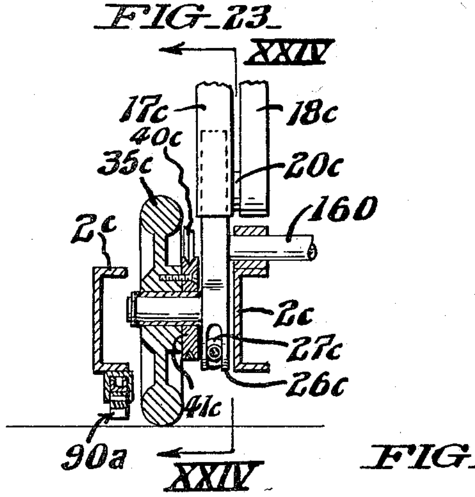
FIG. 23 is a fragmentary view in section taken as indicated by the angular arrows XXIII—XXIII in FIG. 22.
Figure 24:
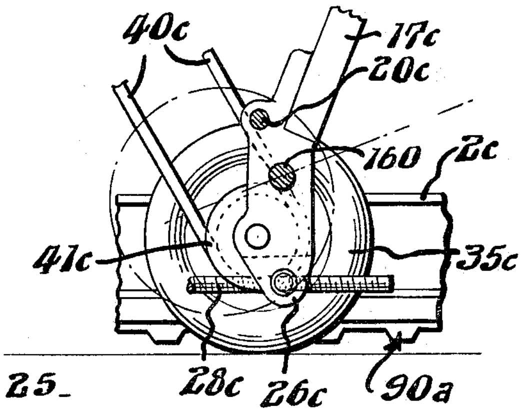
FIG. 24 is a fragmentary view in section taken as indicated by the angular arrows XXIV—XXIV in FIG. 23.
Figure 25:
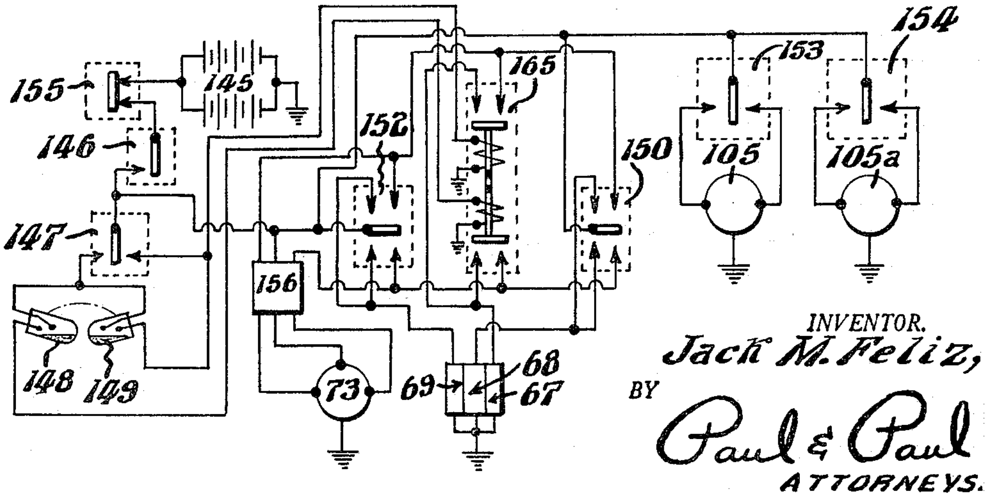
FIG. 25 is a wiring diagram of the electrical instrumentalities relied upon for controlling operation of the modification under power.
Figure 22:
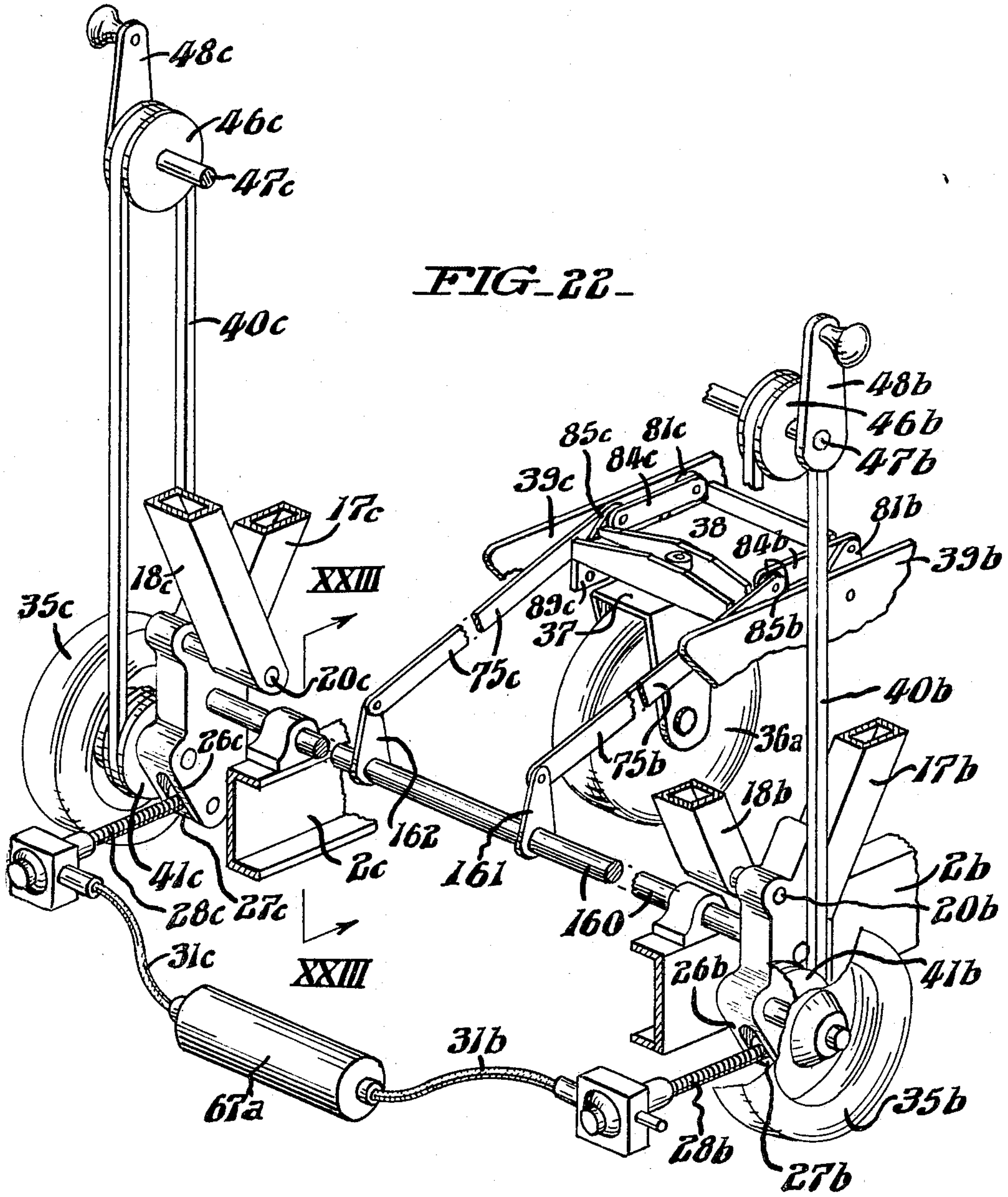
FIG. 22 is a fragmentary view in perspective of a modification of my invention.

In FIGS. 22–24 which illustrate a modified means for raising the jack wheels by which the platform and chair are ordinarily supported during manual propulsion of the conveyance, the components having their counterparts in the first described embodiment of my invention are identified by the same reference numerals with addition of the exponents "*b*" and "*c*." This modification is mainly intended for use on an attendant-operated conveyance in instances where the chair occupant is mentally incapable of controlling the conveyance in stair ascent or descent. Here, the chair-supporting legs 17b and 17c are both fixed upon a transverse fulcrum shaft 160 which is rotatively free in bearings secured respectively to opposite side rails 2b and 2c of the platform frame, and the wheels 35b and 35c are journalled in downward extensions of said legs. In the modification, the pulleys 41b and 41c are secured to the wheels 35b and 35c, and are arranged to be driven directly, through the medium of the belts 40b and 40c, by the pulleys 46b and 46c on the shafts 47b and 47c of the hand cranks 48b and 48c. Affixed to the shaft 160 are arms 161 and 162 which are connected respectively, by means of links 75b and 75c, to the elements 85b and 85c of the portion of the mechanism directly concerned with raising and lowering the caster wheel 36a. As in the first described embodiment, the screw spindles 28b and 28c are engaged in swivel nuts 27b and 27c at the pendent portions 26b and 26c of the chair supporting legs 17b and 17c, but in this instance are arranged to be driven from the transmission unit 67a through the flexible shafts 31b and 31c. Moreover, in the present instance the leads from the mercury switches 148 and 149 and the manual retract lead from the switch 147 are connected, as shown in FIG. 25, to a relay 165 which will take over the functions of the switch 151 of the first described embodiment of my invention. For power operation of the conveyance, the attendant can use the same controls (less switch 151) incident to ascending or descending stairs, incident to walking up or down on the stairs below and facing the occupant whose back would be toward the stairs both during ascension and descension. In the modification, the jack means will remain retracted, when the chair is in collapsed position.

It is to be understood that a conveyance equipped with the modification will be otherwise identical with the first described embodiment of my invention, i.e., with two main tractor belts, two auxiliary frontal tractor belts, two auxiliary rear tractor belts as well as similar means for driving them and positionally adjusting the auxiliary belts angularly relative to the platform in stair ascension or descension.

In preparation for stair ascent, the conveyance is advanced by the attendant, while supported on the wheels **35*b*, 35*c* and 36*a*, to a position in front of the stairs, with occupant's back toward the stairs. The main and auxiliary tractor belts are next set into motion by closing the switches 153 and 154 (FIG. 25). Then by closing switch 152, the rear auxiliary tractor belts are let down to the angularity of the stairs and engaged with the stair treads. As the platform 2*a* is raised toward the angle of the stairs, the automatic seat stabilization circuit of FIG. 25 will intermittently energize the relay 165, motor 73 and solenoid clutch of transmission 67*a* to maintain the chair upright with its seat horizontal as the platform assumes the angularity of the stairs. Moreover during transition of the platform from the horizontal to the angularity of the stairs initially, the wheels 35*b*, 35*c* and 36*a* are retracted as the chair legs 17*c* are moved clockwise in FIGS. 24 and 25 about their fulcrum axis so as to permit the main tractor belts to function. Ascent of the stairs is thereafter accomplished in the same way as hereinbefore set forth in connection with the first embodiment of my invention. When the top landing of the stairs is reached, the rear tractor belts are raised toward normal idle position, and as the platform gradually assumes horizontal position, the jack mechanism is automatically actuated to lower the wheels 35*b*, 35*c* and 36*a* with concurrent raising of the platform and the main tractor belts. As a last step, the auxiliary tractor belts are swung up to idle positions, leaving the apparatus free to be moved by the attendant from the upper landing while supported on the wheels 35*b*, 35*c* and 36*a*. Descent of the stairs is accomplished by reversal of the above procedure in a manner believed to be understandable without further description. The modified construction of FIGS. 22–24 is advantageous from the standpoint of structural economy in that it dispenses with the following parts of the first described embodiment, to wit: motor 33, speed reducer 32, telescopic universal joints and associated parts 66, 66*a*, 65, 65*a*, 64, 64*a*; worm and worm gears 56, 56*a*, rack bars 55, 55*a*; yoke arms and associated components 50 and 50*a*. If the chair occupant is physically unable to manually propel the vehicle, further economy can be obtained by omitting the belts 40*b* and 40*c*, the pulleys 41*b*, 41*c*, 46*b* and 46*c*, the shafts 47*b*, 47*c*, the hand cranks 48*b* and 48*c* and belt tensioning devices 49*a* and 49*b*. With the last described parts omitted, the conveyance can be pushed by an attendant in the same manner as a conventional wheel chair. In FIGS. 22–24, the wheels 35*b*, 35*c* and 36*a*** may be of a larger diameter than those of the first described embodiment to reduce the effort required in pushing the conveyance over door treads or other small obstructions.

While preferred embodiments of this invention have been described in some detail, it will be obvious to one skilled in the art that various modifications may be made without departing from the invention as hereinafter claimed.

Having thus described my invention, I claim:

1. In a load carrying conveyance, a platform to receive the load; main endless belt tractor means supporting the platform for mobility; lever means carrying auxiliary endless belt tractor means disposed on pivots forwardly and rearwardly on the platform and outwardly off-set from said main tractor means and said platform to be operatively clear of said main tractor means and platform to permit rotation of said auxiliary tractor means without interference contact with said main tractor means or platform; power mechanism manually controllable by an operator for driving the several tractor means; rotational means for rotating said several lever means concentrically positioned with said pivots and means for driving said rotational means.

2. A conveyance according to claim 1 wherein said belts are formed of non-stretchable material with teeth on their outer surfaces for preventing slippages in outer surface engagements and also teeth on the inner surface trained about end sprockets for preventing slippage on the inner surface engagement.

3. In a conveyance for invalids, a platform surmounted by a chair for the user, main endless belt tractor means supporting the platform for mobility; lever means carrying auxiliary endless belt tractor means, disposed on pivots respectively forwardly and rearwardly on the platform and outwardly off-set from said main tractor means and said platform to be operatively clear of said main tractor means and platform to permit rotation of said auxiliary tractor means without interference contact with said main tractor means or platform; mechanism under manual control of the chair occupant for driving the several tractor means; rotational means for rotating said several lever means concentrically positioned with said pivots and means for driving said rotational means.

4. A conveyance according to claim 3, wherein the lever arms are swingable individually through a range of substantially 360°.

5. A conveyance according to claim 3, wherein the chair is pivotally supported on the platform, and further comprising automatic means for tilting the chair forwardly or rearwardly relative to the platform during stair ascent or descent to maintain the chair and occupant always in upright position, said means comprising a normally quiescent reversible electric motor, actuating mechanism interposed between the motor and a pair of normally inactive mercury switches mounted on the chair and in circuit with the motor, one of said switches serving to automatically close the circuit for operation of the motor in one direction during ascent of a stairway to tilt the chair forwardly for maintenance of the chair occupant in upright position, and the other switch serving to automatically close the circuit for reverse operation of the motor during descent of the stairway likewise for maintenance of the chair occupant in upright position.

6. A conveyance characterized as in claim 3, wherein the several tractor belts are provided with teeth spaced to react with the edges of the stair treads during stair ascent or descent.

7. A conveyance characterized as in claim 3, wherein the chair is fulcrumed to the platform on a transverse pivot axis and further including automatically-activated power means for tilting the chair forwardly or rearwardly on said axis during stair ascent or descent to maintain the chair and occupant always in upright position.

8. A conveyance characterized as in claim 7, wherein the seat of the chair is supported at opposite sides by two legs in the form of levers fulcrumed at their bottom ends on the pivot axis, and wherein the automatically-actuated power means serves to move the legs in one direction or the other about the common pivot axis for maintenance of the chair and its occupant upright during stair ascension or descenion.

9. A conveyance characterized as in claim 3, wherein said endless belt tractor means are in the form of toothed belts and trained respectively about end sprockets and having teeth spaced for engaging the edges of the stair treads; and wherein worm gearing is involved in the power means and the mechanism locked to hold the conveyance against displacement on the stairs in the event of power failure during ascent or descent.

10. A conveyance characterized as in claim 1, wherein the main tractor means comprises a pair of toothed endless belts, one at each side of the platform trained about sprockets on axes at opposite ends of the platform; wherein each auxiliary tractor means comprises a pair of toothed endless belts, each such belt being trained about end sprockets.

11. A conveyance, according to claim 1, further characterized by a means including a pair of laterally spaced retractable wheels on a transverse axis located substantially equally distant between the front and rear ends of the platform and a retractable coordinated caster wheel pivotally mounted under said platform forwardly or rearwardly of said first mentioned wheels and means for driving the first mentioned wheels concurrently for forward or rearward propulsion of the conveyance, or individually for turning the conveyance either rightward or leftward, or concurrently driving the wheels in opposite directions to swing the conveyance on a minimum radius.

12. A conveyance according to claim 11, wherein the platform is hollow and open from beneath and wherein the three wheels are located within the hollow of the platform with capacity for retraction within said hollow area.

13. A conveyance in accordance with claim 11, further including rotatable power-actuated means, subject to manual control by the seated occupant, whereby the platform and the surmounted chair can be raised through rotation of said power actuated means for access of the occupant to objects at elevations beyond ordinary reach of a seated person.

14. A conveyance in accordance with claim 13, wherein the power-actuated elevating means comprises lever elements fulcrumed respectively to the front and rear ends of the platform and provided respectively at their distal ends with wheels; and wherein the power means is functional to swing the lever elements downwardly about their pivots from normally raised idle positions into floor-engaging positions to raise the platform and the chair for access of the occupant to objects at elevations beyond ordinary reach of a seated person.

15. A conveyance according to claim 11, further having endless belt tractor means, one at each side of the platform normally out of floor contact; power-operable jack means, controllable manually by the occupant of the chair, to upwardly retract the three wheels and thereby permit the platform to recede downwardly until the tractor belts contact the floor; and power means also subject to manual control by the occupant in the chair for driving the conveyor belts simultaneously in one direction or the other to move the conveyance either forwardly or rearwardly, or individually for steering purposes.

16. A load-carrying conveyance according to claim 1 wherein the individual belts are constrained to movement in downwardly open guide channel bars which bear down in supporting relation with the upper surface of the floor-engaging portions of the belts and of which the side flanges downwardly overlap the opposite sides of the floor-engaging portions of the respective belts.

17. A conveyance characterized as in claim 16, wherein the inner teeth of the respective belts are formed on non-stretchable strip material; and wherein said strip material is permanently bonded to an outer layer of toothed pliant strip material molded from tough wear-resistant synthetic rubber or the like.

18. A conveyance, for invalids, having a hollow platform surmounted by a seat for an accupant; a pair of laterally spaced side wheels and a centrally disposed caster wheel longitudinally spaced from the side wheels by which the platform is supported ordinarly; means operable manually by the occupant of the chair for driving the first mentioned wheels concurrently for forward or rearward propulsion of the conveyance, or individually to turn the conveyance either rightward or leftward or concurrently driving the wheels in opposite directions to obtain a minimum turning radius; main endless tractor belts arranged respectively along opposite sides of the platform and trained about sprockets at the front and rear ends of the platform with their lower runs normally out of floor contact; power operable jack means manually controllable from the chair for retracting the aforesaid wheels upwardly and allowing the platform to recede downwardly for contact of the main tractor belts with the floor; a pair of endless auxiliary tractor belts each trained about a pair of sprockets, one of which is coaxial with one of the frontal sprockets of the main tractor belts and the other of which is rotatably borne at the distal end of an arm fulcrumed on the axis of the corresponding frontal sprocket of the main tractor belt; a second pair of endless auxiliary tractor belts each trained about sprockets one of which is coaxial with one of the rear sprockets of the corresponding main tractor belt and the other of which is rotatively borne at the distal end of an arm fulcrumed on the axis of the rear sprocket of the corresponding main tractor belt; power means controllable from the chair for swinging the auxiliary frontal and rear tractor belt units downwardly from normal substantially upright idle positions into active angular positions in preparation for and during ascent or descent of stairways or the like by the conveyance; and power means controllable by the occupant of the chair for driving the main and auxiliary tractor belts concurrently to effect stairway ascent or descent.

19. A conveyance according to claim 18, further including means for automatically maintaining the chair upright during stair ascent or descent.

20. A conveyance for invalids comprising a mobile platform; a chair having side arms and a back collapsible downwardly upon its seat; a pair of legs in the form of levers for supporting the chair at each side, one leg of each pair being fulcrumed on the platform and having a pivotal connection at its distal end with the rear end of the chair seat, and the other leg of each pair being fulcrumed to the first leg and having its distal end releasably engaged with the chair seat at the front end of the latter; manually controllable reversible power means whereby the first mentioned legs can be moved about their fulcra in one direction to lower the chair structure from normal raised position, after being collapsed and the second mentioned legs are disconnected from the chair seat to rest upon the platform with resultant compacting of the conveyance into a small compass so as to require but a small space for its storage or convenience of carriage in an automobile or the like.

21. A conveyance characterized as in claim 20, wherein the platform is sustained for mobility by a pair of laterally spaced side wheels and a coordinated caster wheel longitudinally spaced from said side wheels and centrally disposed relative to them; and means operable manually by the occupant of the chair to drive the first mentioned wheels concurrently for forward or rearward propulsion of the conveyance, or individually to turn the conveyance either rightward or leftward or concurrently driving the wheels in opposite directions to obtain a minimum turning radius.

22. A conveyance according to claim 21, wherein the platform is hollow, and further including main endless tractor belts, one at each side of the platform and trained about sprockets at opposite ends of the platform, said belts being normally out of floor contact; powered jack means manually controllable by the chair occupant for upwardly retracting the wheel group, by which the conveyance is ordinarily sustained for manual propulsion, upwardly into the hollow of the platform to permit the platform to settle and the tractor belts to engage the floor; and reversible power means, also manually controllable by the chair occupant, to drive the tractor belts for forward or rearward progression of the conveyance.

23. A conveyance according to claim 22, further including a pair of endless auxiliary frontal tractor belts, one at each side of the conveyance, trained about sprocket wheels affixed to the shafts of the forward sprocket wheels of the corresponding main tractor belts, and to sprocket wheels at the distal ends of lever arms fulcrumed on the axes of the forward sprocket wheels of the main tractor belts; a pair of auxiliary rear tractor belts, one at each side of the conveyance, respectively trained about sprocket wheels affixed to the shafts of the rear sprocket wheels for the main tractor belts, and about sprocket wheels at the distal ends of lever arms fulcrumed on the shafts of rear sprocket wheels for the main tractor belts; reversible power means manually controllable by the chair occupant for swinging the frontal auxiliary tractor belt units forwardly and downwardly from a normal idle upright position into operative floor engaging position, or rearwardly into parallel relation to the platform when the conveyance is to be stored or transported; and reversible power means, also manually controllable, for similarly swinging the rear auxiliary tractor belt units rearwardly and downwardly from a normal raised idle position into operative floor engagement and, vice versa, back to an idle position in readiness for storage or transportation of the conveyance.

24. A conveyance characterized as in claim 23, wherein the main tractor belts are disposed internally of opposite sides of the hollow platform; and wherein the auxiliary frontal and rear tractor units are disposed outwardly of opposite sides of the platform.

25. A conveyance, for invalids, capable of ascending or descending stairways, comprising a platform with tractor belt means to react with the stair treads; manually controllable power means for driving the tractor belt means; a chair with a seat having a collapsible back and side arms; supporting legs in the form of levers, fulcrumed about a common transverse axis on the platform and to the distal ends of which the seat is pivotally connected at opposite sides whereby said seat is tiltable in operation; automatically operative power means for moving the legs to maintain the chair and occupant upright incident to transition of the platform from the horizontal to the angularity of the stairs in preparation for ascension and again incident to transition of the platform back to the horizontal upon reaching an upper landing or vice versa in stair descension; manually controllable power means by which the chair can be lowered to bring the legs substantially into horizontal relation to the platform with the seat collapsed thereover when the conveyance is to be stored; and means for rendering the automatic means aforesaid inoperative after the chair is lowered and collapsed and until it is again raised for subsequent re-use of the conveyance.

26. A stair ascending or descending conveyance, for invalids, having a platform with a chair pivotally supported thereon; main tractor belt means along the platform; auxiliary frontal and rear tractor belt means pivotally connected respectively to opposite ends of the platform with capacity to be swung downward from normal idle positions to operative positions; manually controlled power means for driving the several tractor belt means; a group of wheels whereby the platform is normally sustained with a main tractor belt means out of floor contract for manual propulsion of the conveyance; manually controlled power means for adjusting both of the auxiliary tractor belt means to the angularity of the stairs in preparation for either stair ascension or descension; power means automatically actuated as the platform assumes the angularity of the stairs at the initiation either of stair ascension or descension, for retracting the aforesaid wheels to permit the main tractor belt means to function and at the same time move the chair about its pivotal connection with the platform to maintain the chair occupant in upright position, and again upon approach of the conveyance at the upper or lower landing, as the case may be, and change of the platform to horizontal position to reversely move the chair about its pivotal connection with the platform for maintenance of the chair occupant likewise in upright position and at the same time lower the wheels to thereafter support the platform with the main conveyer belt means raised from floor contact.

27. A conveyance, for invalids, in accordance with claim 26, wherein the wheel group comprises a pair of laterally spaced side wheels and a centrally disposed swivelled caster wheel disposed at a short distance from the side wheels; and further including hand cranks at opposite sides of the chair seat with pulleys thereon, and drive belts connecting the pulleys respectively with pulleys affixed to the side wheel of the aforesaid group.

28. A load carrying conveyance having a load carrying platform, main endless belt tractor means supporting the platform for mobility; a pair of lever means carrying endless belt auxiliary tractor means mounted on one end of said platform by pivots, each member of said pair of said lever means carrying auxiliary tractor means being outwardly off-set from said main tractor means and platform to permit rotation within substantially 360° of said lever means carrying auxiliary tractor means without interference contact with said main tractor means or platform; means for driving said several tractor means; and rotational means for rotating said several lever means concentrically positioned with said pivots and means for driving said rotational means.

References Cited by the Examiner

UNITED STATES PATENTS

| | | | |
|---|---|---|---|
| 2,220,890 | 11/1940 | Cook | 180—9.52 X |
| 2,572,910 | 10/1951 | Brown | 280—6.1 |
| 2,592,025 | 4/1952 | Gray | 280—211 X |
| 2,710,659 | 6/1955 | Moederle. | |
| 2,770,310 | 11/1956 | Gates | 180—9.22 |
| 2,869,686 | 1/1959 | Glanz. | |
| 3,057,319 | 10/1962 | Wagner. | |
| 3,092,200 | 6/1963 | Chambers | 180—9.22 |
| 3,127,188 | 3/1964 | Grueb | 280—5.22 |
| 3,166,138 | 1/1965 | Dunn | 180—9.24 |
| 3,191,963 | 6/1965 | Prichard | 280—43.23 X |
| 3,204,716 | 9/1965 | Phillips | 180—9.24 X |

FOREIGN PATENTS

| | | |
|---|---|---|
| 875,691 | 8/1961 | Great Britain. |
| 961,370 | 6/1964 | Great Britain. |
| 1,363,987 | 5/1964 | France. |

BENJAMIN HERSH, *Primary Examiner.*

R. J. JOHNSON, *Assistant Examiner.*